Nov. 17, 1964  J. N. ROBINSON  3,157,493
PRODUCTION OF NIOBIUM
Filed Jan. 22, 1962

Inventor
Joseph N. Robinson
by:
Attorney

`3,157,493`
PRODUCTION OF NIOBIUM
Joseph Newton Robinson, Trail, British Columbia, Canada, assignor to The Consolidated Mining and Smelting Company of Canada Limited, Montreal, Quebec, Canada, a corporation of Canada
Filed Jan. 22, 1962, Ser. No. 167,764
8 Claims. (Cl. 75—84.5)

This invention relates to a method for the production of niobium metal from niobium pentachloride. It is particularly directed to providing a method for the production of niobium by a sequence of chemical reactions in which niobium pentachloride and an alkali metal fluoride are reacted to form alkali metal niobium fluoride which, in turn, is reacted with zinc to form a niobium-zinc reduction product.

Processes for the production of niobium are known in which niobium metal is produced from potassium niobium fluoride by reaction with sodium or by electrolysis. The prior art processes have the disadvantages that they involve a relatively complicated and costly sequence of operations, and, in the case of sodium, require the use of a reactant which is costly, difficult to handle and potentially hazardous in handling, transporting and storing.

I have found that the difficulties heretofore encountered in the production of niobium can be overcome by reacting niobium pentachloride with an alkali metal fluoride, preferably sodium or potassium fluoride in a fused bath of alkali metal chlorides, to form an alkali metal niobium fluoride and reacting the alkali metal niobium fluoride with zinc to produce a niobium-zinc reduction product from which the niobium and zinc can be separated and separately recovered.

The starting material for the method which forms the subject matter of this invention is niobium pentachloride. Processes for the production of niobium pentachloride are known and form no part of the present invention. Illustratively, a satisfactory procedure for forming niobium pentachloride is to react a porous bed of ferro-niobium pieces with chlorine gas in a reaction zone to form a gas stream which contains ferric chloride and niobium pentachloride as volatile chlorides with concurrent formation of ferrous chloride. The stream of volatile chlorides is passed upwardly through a porous bed of sodium chloride pieces which is positioned above the reaction zone and maintained at a temperature above the vapourization temperature of niobium pentachloride but below the melting temperature of ferrous chloride. Ferrous chloride is separated from the stream of volatile chlorides as it passes through the sodium chloride bed. Niobium pentachloride is separated and recovered from the stream of volatile chlorides after separation of the ferrous chloride.

The method of this invention comprises, in general, the steps of feeding niobium pentachloride into a fused mixture of sodium chloride, potassium chloride and alkali metal fluoride in a reaction zone in amount sufficient to combine with the niobium content of the niobium pentachloride as potassium-niobium fluoride double salt, maintaining a non-oxidizing atmosphere in the reaction zone, providing zinc in said reaction zone for reaction with the potassum-niobium fluoride double salt in amount sufficient to form a niobium-zinc reduction product, separating niobium-zinc reduction product from the fused salt bath, and separating and separately recovering niobium and zinc from the niobium-zinc reduction product.

In the operation of the present method, niobium pentachloride, $NbCl_5$, dissolves in the fused salt bath to form potassium niobium fluoride, $K_2NbF_7$. It is found that the niobium-zinc reduction product forms in the zinc layer only to a limited extent. Most of the niobium-zinc reduction product forms as a deposit, either on the fixture 14, shown in FIGURE 1 and described in detail hereinafter, or on the walls of the container above the level of the molten zinc bath, as illustrated in FIGURES 2 and 3, which indicates that the reduction actually occurs in the fused salt bath. Thus, it is believed that the reduction of the potassium niobium fluoride and the formation of the niobium-zinc reduction product are caused by the zinc dissolved in the fused salt bath. The reducing reaction can be explained as proceeding in the fused salt bath which, in the upper part, where the niobium pentachloride is fed into the bath, is rich in potassium niobium fluoride and low in zinc, and which, in the lower part adjacent to the zinc layer, is low in potassium niobium fluoride and rich in dissolved zinc.

It is found that the best results are obtained in the operation of the method when an adequate supply of zinc is dissolved in the fused salt bath. The zinc supply in the fused salt bath can be increased by increasing the temperature of the bath or, preferably, by providing a small flow of inert gas, such as argon, through the zinc layer into the salt bath. The inert gas serves to agitate the zinc and, possibly, carries zinc vapour into the salt bath. It also serves to agitate the salt bath. It is found that if the flow of inert gas is too strong, niobium zinc reduction product tends to deposit around the niobium pentachloride tube and thus closes the outlet end. The flow of inert gas should be sufficient to agitate the pool of zinc and the salt bath gently to ensure distribution of the reactants throughout the bath.

The apparatus for carrying out the method for the production of niobium of this invention comprises a container enclosing a reaction zone, an internal lining for the container resistant to attack by fused alkali metal chlorides and fluorides, inlet means for feeding niobium pentachloride into said container, inlet means for feeding an inert gas into said container, means for providing a supply of molten zinc in said container exposed to the fused salt bath, and means in said container exposed to the fused salt bath for collecting niobium-zinc reduction product.

An understanding of the method of this invention can be obtained from the following description, reference being made to the accompanying drawing in which.

Like reference characters refer to like parts throughout the description of the invention and the drawing.

Figure 1:
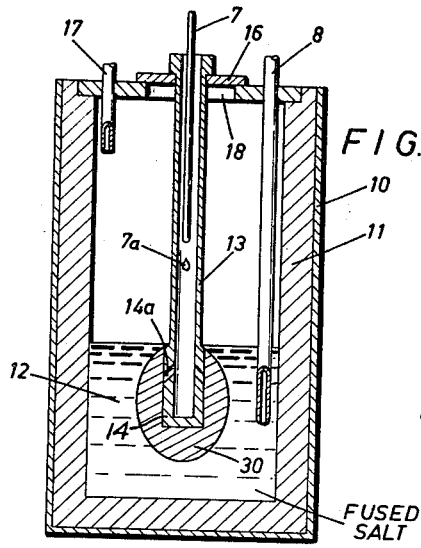
FIGURE 1 is an elevation in section of an apparatus suitable for the production of niobium by the method of this invention.

Referring to FIGURE 1, the numeral 10 indicates a container of suitable shape, for example, rectangular or circular. It preferably is formed of a stainless steel outer shell and is lined with a lining 11, such as graphite, which is resistant to corrosion by the fused salt bath and by molten zinc.

The container is filled to a desired level with a fused sodium chloride-potassium chloride salt bath 12 which contains an alkali metal fluoride, such as potassium fluoride, as described in detail hereinafter. These components can be charged into the container as required through the opening 18 at the top which is closed by the removable cover 16.

A graphite tube 13 extends through an opening in the cover 16 downwardly into the fused salt bath 12 and terminates above the bottom of the container a distance sufficient for the growth of a niobium-zinc alloy reduction product agglomerate 30 to a desired size without contact with the lining 11. Zinc is fed into the fused salt bath 12 through the tube 13. Conveniently, a zinc rod 7 can be fed into the upper end of the tube 13 and advanced towards the lower end. As the temperature of the reaction zone is substantially above the melting point of zinc, the lower part of the rod melts, as illustrated by the droplet indicated by the numeral 7a, below the top of the tube and falls through the lower part of the tube into the fused salt bath at the lower end of the tube.

A fixture 14 is secured to and encloses the lower end of the tube 13. This fixture is positioned within the bath, preferably centrally. It is formed of a material such as graphite, which is resistant to corrosive attack by the fused salt bath, with openings 14a for the circulation of molten zinc and fused salt into and through it. It provides a core on which niobium-zinc reduction product 30 collects and grows as the reaction between the potassium niobium fluoride and the zinc proceeds. When it has grown to a desired size, the graphite tube and fixture are removed together with the niobium-zinc agglomerate attached to the fixture, another graphite tube and fixture are inserted, and the reaction is continued.

An inlet pipe 17 is provided in the upper part of the container for the admission of an inert gas, such as argon, which serves to maintain an inert atmosphere in the container.

An inlet pipe 8, connected at its outer end to a source of niobium pentachloride, extends from the top of the container to a point adjacent to the bottom. Niobium pentachloride is fed through this pipe into the fused salt bath 12.

The pipes 8 and 17 preferably are formed of graphite, to ensure resistance to corrosion.

Figure 2:
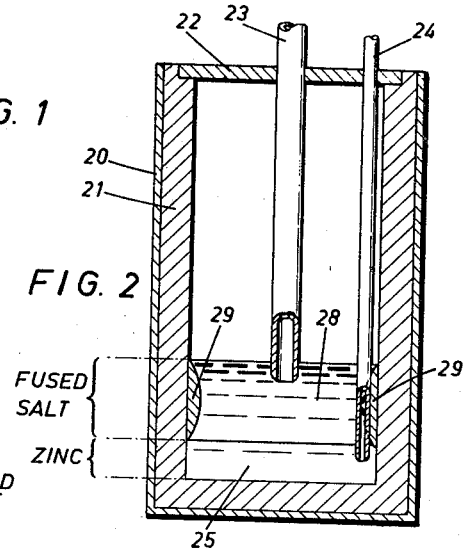
FIGURE 2 is an elevation in section of the apparatus illustrated in FIGURE 1 in which the zinc metal is positioned as a molten bath below the fused salt bath.

FIGURE 2 illustrates an alternative arrangement of the container and ancillary parts. The shell 20, the lining 21, the removable cover 22, the niobium pentachloride and inert gas inlet pipes 23 and 24, respectively, are the same as in FIGURE 1 described above. A pool of molten zinc metal 25 is provided in the bottom of the container. A fused salt bath 28 is positioned above the pool of molten zinc. In this modification, a deposit of niobium-zinc reduction product 29 is formed and grows on the graphite liner in the area covered by the fused salt bath. The lower open end of the pipe 24 terminates in the bath of molten zinc.

Figure 3:
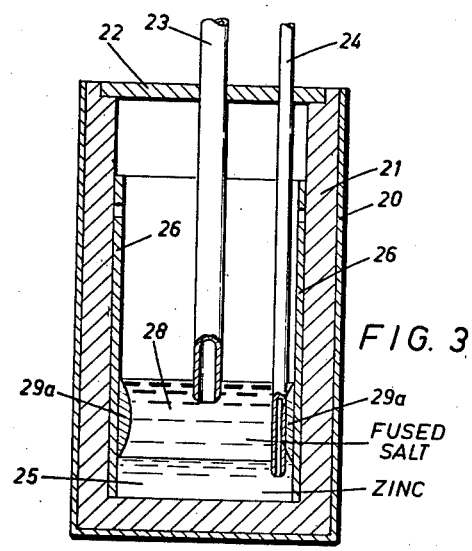
FIGURE 3 is an elevation in section of a further modification of the apparatus illustrated in FIGURE 1.

FIGURE 3 illustrates a modification of the apparatus illustrated in FIGURE 2 in which a removable liner 26 is provided in the container 20. This liner also is formed of material, for example, graphite, which is inert to corrosive attack by the fused salt bath. It extends from the bottom of the container to a short distance below the top. This liner 26 provides a surface on which the niobium-zinc reduction product collects, as indicated by the numeral 29a, as the reaction proceeds between the zinc and the potassium niobium fluoride. When the niobium-zinc deposit has grown to a desired size, the liner 26 and niobium-zinc deposited thereon are removed from the container.

Containers 10–20 can be heated to and maintained at the desired reaction temperature, which is above the melting temperature of the fused salt bath but below the vapourization point of zinc, preferably within the range of from about 700° C. to about 880° C., by the use of conventional heating means, such as electric resistance coils, not shown, or it can be heated to reaction temperature in a heating furnace, or by circulating the fused salt bath and maintaining it at reaction temperature outside the container.

Zinc can be separated from the agglomerates 29, 30 and 29a by vacuum distillation, leaving a niobium product which is substantially free from zinc and other impurities.

The reactions involved in the operation of the method can be expressed by the following equations:

$$NbCl_5 + 7KF \rightarrow K_2NbF_7 + 5KCl \quad (1)$$
$$2K_2NbF_7 + 11Zn \rightarrow 2NbZn_3 + 5ZnF_2 + 4KF \quad (2)$$
$$ZnF_2 + 2KCl \rightarrow ZnCl_2 + 2KF \quad (3)$$

It will be noted in these reactions that the niobium pentachloride first reacts with the fluoride to form potassium niobium fluoride which reacts with the zinc to form, as identified herein, a niobium-zinc reduction product. This intermetallic reduction product deposits and grows on the fixture 14, as illustrated in FIGURE 1, or on the wall or on the removable liner as in the modifications of the method illustrated in FIGURES 2 and 3.

The fused salt bath can be prepared with 1.0 part potassium chloride, 0.262 part sodium chloride, 0.393 part sodium fluoride. When saturated with niobium pentachloride, this fused salt mixture contained, by weight, 40% modium chloride, 40% potassium chloride and 20% potassium niobium fluoride.

Theoretically, a total of 1.317 grams of zinc is required per gram of niobium pentachloride, 0.592 gram of zinc being required for the reduction of potassium niobium fluoride and 0.725 gram being required for niobium-zinc crystallization as $NbZn_3$. For optimum results in the operation of the process, zinc should be provided in excess of the theoretical requirement for formation of the compound $NbZn_3$. If the amount of zinc present during the process is not in excess of the amount theoretically required to form $NbZn_3$, the niobium-zinc reduction product is deposited as very fine crystals. This fine crystal size causes difficulty in the subseqeunt recovery of the niobium after removal of the zinc. Preferably, therefore, more zinc is provided than is required for formation of the compound $NbZn_3$, which is deposited in coarsely crystalline form in the presence of excess zinc.

I have found that very satisfactory results are obtained in the operation of the process at a temperature within the range of from about 700° C. to about 880° C., preferably about 750° C. The melting point of a 1:1 molar sodium chloride-potassium chloride fused salt bath is about 658° C. and the maximum temperature of the bath is limited to 905° C., the boiling point of zinc.

In the operation of the process in the container illustrated in FIGURE 1, niobium pentachloride vapour is bubbled into the fused salt bath through inlet 8. When the fused salt bath is almost saturated with niobium pentachloride, zinc metal, for example, in the form of a zinc rod 7, is fed into the fixture 14 at a rate approximately equal to the rate of feeding niobium pentachloride into the bath. A deposit 30 of niobium-zinc crystals forms on the fixture 14. When the deposit grows to a desired size, it is withdrawn from the container and a new rod and collection fixture 14 are inserted. Niobium-zinc alloy deposits can be formed in and extracted from the fused salt bath until the accumulation of zinc chloride in the molten bath becomes excessive.

In the operation of the method in the container illustrated in FIGURES 2 and 3, a pool of molten zinc 25 is maintained at the bottom of the container and the fused salt bath is positioned above the zinc. Niobium pentachloride is bubbled into the fused salt bath and an inert gas, such as argon, is bubbled slowly into the zinc.

The niobium-zinc reduction product deposits from the fused salt bath onto the wall, as illustrated in FIGURE 2 and on the removable liner 26, as illustrated in FIGURE 3. In the operation of the modification of the method illustrated in FIGURE 3, at the end of a reduction cycle, which is based on a predetermined amount of fused salt bath, zinc and niobium pentachloride, the following sequence of operations is conducted as quickly as possible:

(a) The niobium pentachloride and inert gas inlet pipes in the top of the container are removed.

(b) The removable liner 26 is lifted from the container and the niobium-zinc reduction product is removed, for example, with a stainless steel plunger.

(c) The fused salt charge is removed by displacing the salt into a holding vessel, not shown.

(d) Additional zinc is charged into the bottom of the container, fresh fused salt mixture is charged into the container, the removable liner and top assemblies are replaced and the reduction cycle is repeated.

An important function of the inert gas is to circulate the fused bath and assist in saturating it with zinc which promotes the formation of the niobium-zinc reduction product.

The niobium-zinc reduction product can be treated by any one of several methods for the separation and separate recovery of the respective metals. For example, the alloy can be leached with dilute sulphuric acid, about 10% normal, to separate excess zinc. The resulting alloy crystals can then be vacuum distilled at from about 900° C. to about 2000° C. to remove the residual zinc by distillation. The niobium residue can then be sintered in a vacuum at from about 1700° C. to about 2000° C. to give the product stability in air. The resulting product is a niobium sponge which can be converted to a powder by mechanical methods. The vacuum distillation and sintering can be conducted as a single operation, if desired, in a vacuum resistance furnace.

The following examples illustrate the results which can be obtained in the operation of the method of this invention. Example A illustrates the operation of the method in the container illustrated in FIGURE 1 and identified as the "Alloy Agglomerate Method." Example B illustrates the operation of the method in the container illustrated in FIGURE 3 and is identified as the "Graphite Liner Method." All the percentages are by weight.

EXAMPLE A

*Alloy Agglomerate Method*

Salt charge:
- KCl _____ 1,170 grams,
- NaCl _____ 448 grams.
- NaF _____ 672 grams.
- $NbCl_5$ addition rate _____ 15 grams per minute.
- Operating temperature _____ 850° C.

| Agglomerate No. | Zn Addition, grams | Total Agglomerate Weight, grams | Weight of Nb-$Zn_3$ after leaching, grams |
|---|---|---|---|
| 1 | 697 | 724 | 371 |
| 2 | 716 | 796 | 380 |
| 3 | 710 | 808 | 401 |
| 4 | 714 | 839 | 379 |
| Clean-up zinc | [1] 1,000 | | 306 |
| Total | 3,837 | | 1,837 |

[1] Added to bath at end of run to react with $K_2NbF_7$ remaining in bath after $NbCl_5$ addition was stopped.

Total $NBCl_5$ reacted —2,258 grams=767 grams niobium.
Niobium in 1,837 grams alloy at 35% Nb=642 grams.
Percent niobium recovery in alloy=83.7%.

EXAMPLE B

*Graphite Liner Method*

Salt charge per reduction cycle:
- KCl _____ grams__ 1,273
- NaCl _____ do____ 341
- NaF _____ do____ 508
- Operating temperature _____ ° C.__ 750
- $NbCl_5$ reacted per cycle _____ grams__ 1,410

| Reduction Cycle | Zinc Addition, grams | $NbCl_5$ Rate, grams per minute | Liner Product $NbZn_3$+Zn, grams | Leached Nb-$Zn_3$ after leaching, grams |
|---|---|---|---|---|
| 1 | 4,000 | 12 | 2,289 | 1,045 |
| 2 | 2,600 | 20 | 1,793 | 1,045 |
| 3 | 2,600 | 13 | 2,403 | 1,127 |
| 4 | 2,600 | 20 | 2,013 | 1,047 |
| Misc. Alloy [1] | | | | 393 |
| Total Nb-$Zn_3$ | | | | 4,657 |

[1] Niobium-zinc alloy recovered from zinc bath.

Total $NbCl_5$ reacted=4(1,410)=5,640 grams=1,920 grams Nb.
Niobium in 4,657 grams $NbZn_3$=4,657(.323)=1,500 grams.
Niobium recovery=78.3%.

The method for the production of niobium of this invention possesses a number of important advantages. Zinc is readily available, it is inexpensive and presents no handling problems. Also, tantalum usually is associated with niobium in the niobium bearing material from which the pentachloride is produced and, if so, may be, and usually is, present in the pentachloride. It is found that alkali metal tantalum fluoride does not react readily with the zinc to produce a tantalum-zinc reduction product. Thus, it is found that niobium which is substantially free from tantalum can be produced by this method from a niobium pentachloride which contains tantalum. Thus, an essential step in the preparation of niobium pentachloride for the conventional direct reduction system is unnecessary when using the process of the present invention. For example, in tests as described above with niobium pentachloride feed containing 2% to 5% tantalum pentachloride by weight, the tantalum content of the niobium metal produced ranged from a maximum amount of about 0.1% to an amount not detectable by spectrographic methods.

A further important advantage of the method described above over the conventional direct reduction system is that a completely oxygen-free reduction system and chloride feed material, while desirable, are not essential for the production of low oxygen niobium as any oxygen present forms potassium niobium oxyfluoride, $K_2NbOF_5$, which is not reduced by the zinc.

It will be understood, of course, that modifications can be made in the preferred embodiments of the method described above without departing from the scope of the invention defined by the appended claims.

What I claim as new and desire to protect by Letters Patent of the United States is:

1. In a method for the production of niobium from niobium pentachloride in which niobium pentachloride is reacted in a fused salt bath with an alkali metal fluoride to form an alkali metal niobium fluoride, the improvement which comprises reacting alkali metal niobium fluoride in the fused salt bath with zinc in elemental form whereby a niobium-zinc reduction product is produced as a solid precipitate, and recovering niobium from said niobium-zinc reduction product.

2. The method according to claim 1 in which the fused salt bath is maintained at a temperature within the range of from about 700° C. to about 880° C.

3. The method according to claim 1 in which the zinc is provided below the salt bath as a molten pool.

4. The method according to claim 1 in which zinc is provided below the fused salt bath as a molten pool and an inert gas is fed into the molten pool of zinc.

5. The method according to claim 1 in which the zinc is provided in excess of the amount required to produce a reduction product consisting essentially of niobium and zinc in the molecular ratio of 1 part niobium to 3 parts zinc.

6. In a method for the production of niobium from niobium pentachloride in which niobium pentachloride is reacted in a fused salt bath with an alkali metal fluoride to form an alkali metal niobium fluoride, the improvement which comprises reacting alkali metal niobium fluoride in the fused salt bath with zinc in elemental form to produce a niobium-zinc reduction product, separating niobium-zinc reduction product from the fused salt bath, separating excess zinc from the niobium-zinc reduction product, and thereafter separating residual zinc from the reduction product by vacuum distillation.

7. The method of producing niobium which comprises the steps of injecting niobium pentachloride into a fused sodium chloride-potassium chloride salt mixture contained in a reaction zone which contains also an alkali metal fluoride in amount sufficient to combine with the niobium content of the niobium pentachloride to form alkali metal niobium fluoride double salt, maintaining a non-oxidizing atmosphere in the reaction zone, providing zinc in said reaction zone exposed to and for reaction with the potassium niobium fluoride double salt to form a niobium-zinc reduction product, separating niobium-zinc reduction product from the fused salt bath, and separating and separately recovering niobium and zinc from the niobium-zinc reduction product.

8. The method of producing niobium which comprises the steps of injecting niobium pentachloride into a fused sodium chloride-potassium chloride salt mixture contained in a reaction zone which contains also an alkali metal fluoride in amount sufficient to combine with the niobium content of the niobium pentachloride to form alkali metal niobium fluoride double salt, maintaining a non-oxidizing atmosphere and a temperature of from about 700° C. to about 880° C. in the reaction zone, providing zinc in said reaction zone exposed to and for reaction with the potassium niobium fluoride double salt to form a niobium-zinc reduction product, separating niobium-zinc reduction product from the fused salt bath, and separating and separately recovering niobium and zinc from the niobium-zinc reduction product.

References Cited in the file of this patent

FOREIGN PATENTS

| | | |
|---|---|---|
| 386,621 | Great Britain | Feb. 2, 1933 |
| 763,731 | Great Britain | Dec. 19, 1956 |
| 876,802 | Great Britain | Dec. 23, 1957 |